(12) United States Patent
Meitinger et al.

(10) Patent No.: US 8,700,245 B2
(45) Date of Patent: Apr. 15, 2014

(54) METHOD FOR OPERATING A MOTOR VEHICLE HAVING AT LEAST TWO DRIVES AND A MOTOR VEHICLE HAVING AT LEAST TWO DRIVES

(75) Inventors: Karl-Heinz Meitinger, Munich (DE); Michael Wein, Seubersdorf (DE); Sebastian Strasser, Ingolstadt (DE); Martin Werner, Neu-Ulm (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/641,347

(22) PCT Filed: Mar. 29, 2011

(86) PCT No.: PCT/EP2011/001560
§ 371 (c)(1),
(2), (4) Date: Oct. 15, 2012

(87) PCT Pub. No.: WO2011/128024
PCT Pub. Date: Oct. 20, 2011

(65) Prior Publication Data
US 2013/0035818 A1 Feb. 7, 2013

(30) Foreign Application Priority Data
Apr. 14, 2010 (DE) .......................... 10 2010 014 971

(51) Int. Cl.
*B60W 10/00* (2006.01)
*B60W 20/00* (2006.01)
*B60K 1/00* (2006.01)
*B60K 5/00* (2006.01)
*B60K 6/00* (2007.10)
*H02P 5/00* (2006.01)

(52) U.S. Cl.
USPC ................ 701/22; 701/69; 701/99; 180/69.6; 180/65.1; 318/34; 318/54

(58) Field of Classification Search
USPC ........... 701/22, 69, 99; 180/65.1, 69.6, 65.21, 180/65.28, 65.285, 65.29; 318/34, 51, 54; 903/902–908
See application file for complete search history.

(56) References Cited

U.S. PATENT DOCUMENTS 5,148,883 A * 9/1992 Tanaka et al. ................. 180/165
5,164,903 A * 11/1992 Lin et al. ......................... 701/89
(Continued)

FOREIGN PATENT DOCUMENTS

DE          102 25 873          3/2003
DE      10 2004 034 401         2/2005
(Continued)

OTHER PUBLICATIONS

International Search Report for PCT/EP2011/001560, mailed Jul. 6, 2011.
(Continued)

*Primary Examiner* — Fadey Jabr
*Assistant Examiner* — Courtney Heinle
(74) *Attorney, Agent, or Firm* — Staas & Halsey LLP

(57) ABSTRACT

In a motor vehicle having two, in particular electrical, drives, a partial torque is in each case intended to be assigned to the individual drives from a demanded total torque, to be precise taking account of the energy efficiency on the one hand and the stability of the vehicle on the other hand. A first controller is responsible for taking account of the energy efficiency, and predetermines a bandwidth of possible partial torques for an individual drive. This bandwidth may be restricted by a second controller, when driving stability requires this. The second controller is coupled to appropriate sensors (yaw rate sensor, lateral acceleration sensor, longitudinal acceleration sensor) and knows the steering angle φ. In the course of interchanging data signals with a first control device, the partial torques are defined with the involvement of the second control device, for which purpose the first control device emits control commands.

13 Claims, 3 Drawing Sheets

(56) References Cited

U.S. PATENT DOCUMENTS

| | | | |
|---|---|---|---|
| 5,453,930 A * | 9/1995 | Imaseki et al. | 701/22 |
| 5,508,924 A * | 4/1996 | Yamashita | 701/22 |
| 6,909,959 B2 * | 6/2005 | Hallowell | 701/88 |
| 7,389,176 B2 * | 6/2008 | Kadono et al. | 701/114 |
| 7,634,342 B2 * | 12/2009 | Post, II | 701/48 |
| 7,739,005 B1 * | 6/2010 | Tang | 701/22 |
| 7,937,194 B2 * | 5/2011 | Nasr et al. | 701/22 |
| 8,087,484 B2 * | 1/2012 | Seel et al. | 180/65.265 |
| 8,285,462 B2 * | 10/2012 | Heap et al. | 701/54 |
| 8,321,100 B2 * | 11/2012 | Heap | 701/54 |
| 8,332,112 B2 * | 12/2012 | Handa et al. | 701/69 |
| 2009/0118924 A1 | 5/2009 | Hsieh et al. | |
| 2010/0222953 A1 * | 9/2010 | Tang | 701/22 |
| 2011/0054736 A1 * | 3/2011 | Giers et al. | 701/37 |
| 2011/0307129 A1 * | 12/2011 | Yu et al. | 701/22 |
| 2012/0158225 A1 * | 6/2012 | Books et al. | 701/22 |

FOREIGN PATENT DOCUMENTS

| | | |
|---|---|---|
| DE | 10 2004 049 324 | 4/2006 |
| DE | 10 2006 000 306 | 2/2007 |
| DE | 10 2006 046 093 | 4/2008 |
| DE | 10 2007 024 207 | 11/2008 |
| DE | 10 2008 042 228 | 4/2010 |
| DE | 10 2010 014 971 | 4/2010 |
| EP | 1 369 284 | 12/2003 |
| WO | 03/059680 | 7/2003 |
| WO | 2008/071381 | 6/2008 |
| WO | 2010/031678 | 3/2010 |
| WO | PCT/EP2011/001560 | 3/2011 |

OTHER PUBLICATIONS

German Office Action for German Priority Patent Application No. 10 2010 014 971.3, issued on Nov. 12, 2010.

* cited by examiner

METHOD FOR OPERATING A MOTOR VEHICLE HAVING AT LEAST TWO DRIVES AND A MOTOR VEHICLE HAVING AT LEAST TWO DRIVES

CROSS REFERENCE TO RELATED APPLICATIONS

This application is based on and hereby claims priority to International Application No. PCT/EP2011/001560 filed on Mar. 29, 2011 and German Application No. 10 2010 014 971.3 filed on Apr. 14, 2010, the contents of which are hereby incorporated by reference.

BACKGROUND

The invention relates to a method for operation of a motor vehicle having at least two drives. It also relates to a motor vehicle.

A method for operation of a motor vehicle having two electrical drives for different axles of the motor vehicle is known, in particular, from US 2009/0118924 A1. The method makes use of a control unit. This receives inputs, for example an input by which a specific torque is demanded, for example that resulting from the position of an accelerator pedal or gas pedal (this also applies to a brake pedal). Further inputs originate from a rotation speed sensor as well as sensors which relate to parameters such as pressure and temperatures of components of the motor vehicle, in particular of the motor or engine, and of the surrounding area as well. The controller then sends control signals to actuators which operate the motors or engines, for example fuel injectors, a throttle valve etc. A minimum and a maximum torque are determined for each motor or engine. Specific criteria are applied, with a distinction being drawn between three different cases here. Finally, an output torque is allocated to the individual motors or engines.

A demanded torque is also determined during operation of a motor vehicle having two motors or engines, according to DE 10 2006 000 306 A1. The calculation of the torque demand in this case includes the gear selection position, the vehicle speed, the rotation speeds of the two motors or engines as well as an input limit and an output limit of the battery. A lower torque limit is calculated for one motor or engine. This then results in a torque command to the relevant motor or engine, matched to the torque demand. The method from DE 10 2006 000 306 A1 is limited to a brake controller, that is to say it is used during braking of the motor vehicle.

DE 10 2004 034 401 A1 discloses a drive controller being used to match two drive units to one another such that a total drive power which is emitted by the two drive units in order to drive wheels corresponds to a driver demand output.

DE 10 2004 049 324 A2 describes that, in the case of a hybrid vehicle, the driver demand is determined by a first module as a function of a pedal position, and a value for a drive torque which corresponds to this driver demand is passed to a control unit where further measured values, such as the speed of travel etc., are taken into account, in order to calculate a distribution level which corresponds to the ratio of the torque from the electric motor to the drive torque. This distribution level is passed to a closed-loop control stage, which calculates a second distribution level, corresponding to driving dynamic functions. Both distribution levels are passed to a coordination stage, which uses actuation limits of the motor and engine to determine the final distribution level.

WO 2010/031678 A1 discloses that an overall drive torque is first of all determined in order to adjust a motor drive device having two drive units, and the torque distribution for the drive units is subsequently defined therefrom, taking account of constraints from driving-dynamic control systems. A consumption-optimum torque distribution is then calculated therefrom, taking account inter alia, of restrictions of originating from the motor or engine drive units. If this cannot be done, feedback is provided, as a result of which the consumption-optimum torque distribution is recalculated.

The methods which are known from the related art for operation of a motor vehicle having two drives ensure allocation of the demanded torque to the individual drives on the basis of specific criteria, such as the energy efficiency and/or the availability of current through a battery for one electrical drive. The distribution of torque to individual axles of the motor vehicle also, however, has a direct effect on the driving behavior of the motor vehicle. It is known for the torque to be moved from one axle to another axle in order to stabilize a motor vehicle, and possibly also from one wheel on one axle to another wheel on one axle.

It will be desirable to also ensure stabilization of the vehicle in a similar manner in a motor vehicle having two drives, at least in specific situations, where this is necessary, for example when turning or to improve the traction.

SUMMARY

One potential object is therefore to further develop a method for operation of a motor vehicle having two drives in such a way that it is possible to ensure stabilization of the motor vehicle to an increased extent. The proposed motor vehicle may be suitable for this purpose.

The inventors propose a method for a motor vehicle having a plurality of drives and a first control device. The first control device first of all uses the measured values to predetermine a family of combinations of respective partial torques for individual drive units (the individual drives or else for groups of drives, for example on one axle), and sends data signals to describe this combination to a second control device. This second control device receives measured values relating to variables, of which second variables differ from those first variables with which the measured values received by the first control device are associated. Particularly as a function of the measured values received by it, the second control device selects at least one combination of the respective partial torques for the individual drives (or groups of drives) from the family of combinations, and sends data signals to describe this at least one combination to the first control device. The first control device then defines the partial torques for the individual drives; alternatively, it does this only for groups of drives or for a group and an individual drive. Generally, when the second control device selects more than two combinations of respective partial torques for the individual drives, the first control device once again makes a selection from this plurality of combinations selected by the second control device, to be precise as a function of the measured values which are received by the first control device.

There is therefore a task of distribution between the individual control devices: the first control device makes a general preset, and the second control device then restricts the preset. In particular, the second control device may have the task of controlling the stability of the vehicle. In contrast, the first control device can then apply other criteria, at least to a certain extent, although this is done only after the second control device has restricted its capabilities. Because the second control device restricts the capabilities of the first control device, it has an important role. In particular, the capabilities can be restricted by also ensuring adequate stability of the vehicle for all of the torque distribution options which remain after the restriction.

In one particularly simple embodiment, the first control device defines a bandwidth for the partial torques of at least one drive or for the partial torques of a plurality of such drives overall, which is restricted by the second control device. In other words, the first control device sends transmitted information relating to a maximum and a minimum partial torque for at least one drive/drive group to the second control device, and the second control device sends feedback information, in response to this, relating to a maximum and a minimum partial torque for this and only this at least one drive/only this drive group to the first control device, possibly alternatively or additionally a defined partial torque therefor as well. A restriction in the bandwidth can then be defined such that, at least for a time during operation of the motor vehicle (specifically in particular in a predetermined driving situation in which intervention in drive control is required—also referred to as driving dynamic control), the maximum partial torque and/or the defined partial torque based on the feedback information is less than the maximum partial torque based on the transmitted information; this would result in the bandwidth being restricted from above. Alternatively, the minimum partial torque and/or the defined partial torque based on the feedback information may be greater than the minimum torque based on the transmitted information; the restriction is then applied from below. In particular, both can be done at the same time. The family of combinations then corresponds to all the combinations in which the partial torque for the at least one drive is between the minimum and the maximum partial torque. This family may be finite as a result of quantization, although in principle, an infinitely large number of values are possible between the minimum and the maximum partial torque, then making it possible to provide an infinitely large number of combinations of respective partial torques in this family.

In order to allow the second control device to make a selection to ensure increased stability of the motor vehicle, it preferably receives measured values relating to a yaw rate of the motor vehicle, to a longitudinal acceleration of the motor vehicle and/or to a lateral acceleration of the motor vehicle and/or to a steering angle on a steering control, and may take direct account of at least one of these measured values when selecting the at least one combination. In the case of certain values for the variables, it is possible for the second control device to be able to select all the possible combinations from the family of combinations at once. There is therefore no need for intervention in the chassis control.

At least one drive is preferably an electrical drive. In this case, it is particularly worthwhile for the first control device to receive measured values relating to a battery which is associated with that electrical drive in order that an electrical drive is preferably preferred over an internal combustion engine, in order to improve the efficiency, or one electrical drive is preferred over another electrical drive when the battery for the preferred electrical drive allows its operation for at least a specific time period.

In addition, the first control device may receive measured values relating to a rotation speed of a motor or engine and/or of a temperature of the motor or engine and/or a gear selected at a gearbox, and/or an operating mode. In particular, a voltage provided by the battery or the charge stored in it, its charge capability and measured value which describes its temperature may be received as measured values relating to the battery. These measured values may be evaluated using specific criteria.

The inventors also propose a motor vehicle having at least two (in particular electrical) drives and a first control device for allocation of torque to the individual drives and for transmission of appropriate demand signals to these drives. The first control device is coupled to a second control device, which is itself coupled to at least one measurement device which is separated from the first control device, and with the second control device being designed to take part in allocating torque to the individual drives by interchange of data signals with the first control device in the sense of the method to take account of measured values from the at least one measurement device in the formation of transmitted data signals (specifically relating to the definition thereof).

Each control device may be provided by a separate controller, or may be in the form of a software functionality (block) in a single controller.

The inventors propose two control devices, both of which are equally involved in the allocation of torque to the individual drives. This makes it possible for one of the control devices to carry out the task of ensuring stability of the motor vehicle, while the other control device can use other criteria, for example the energy efficiency.

Therefore, in one preferred embodiment, the at least one measurement device comprises a yaw rate sensor, a longitudinal acceleration sensor and/or a lateral acceleration sensor and/or a unit for measurement of a steering angle on a steering control, in order to ensure that the second control device receives appropriate information relating to the stability of the vehicle.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
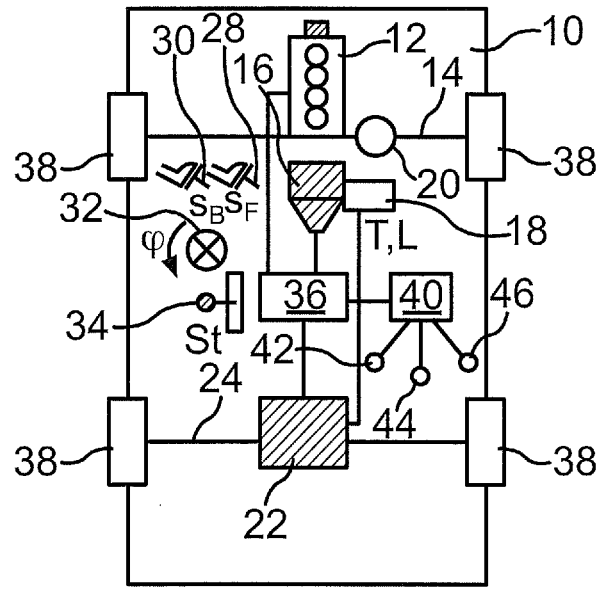
FIG. 1 schematically illustrates individual elements of a motor vehicle.

Reference will now be made in detail to the preferred embodiments of the present invention, examples of which are illustrated in the accompanying drawings, wherein like reference numerals refer to like elements throughout.

First of all, an internal combustion engine 12 is available as a drive in a motor vehicle which is annotated 10 as an entity; this internal combustion engine 12 drives a front axle 14 of the motor vehicle. At the same time, an electrical drive 16 is available for the front axle 14, and is fed from a battery 18. In this case, a drive torque is input via a gearbox 20. There is a second electrical drive 22 for a rear axle 24 of the motor vehicle. The second electrical drive is fed from the same battery 18. A vehicle driver can use an accelerator pedal ("gas pedal") 28 to predetermine how fast the motor vehicle 10 is intended to travel, and a brake pedal 30 can be used for braking. The motor vehicle 10 can be steered with the aid of a steering wheel 32. A mode can be selected by an operating element 34.

A controller 36 determines what total torque can be applied to the individual wheels 38 of the motor vehicle. In this case, it is necessary to allocate what partial torque can in each case be applied by the internal combustion engine 12, by the electrical drive 16 and by the electrical drive 22. This allocation process is carried out by the controller 36. In order to determine the total torque and for allocation, the controller 36 receives measured values, specifically the position $s_F$ of the accelerator pedal 28, the position $s_B$ of the brake pedal 30 and the position St of the operating element 34. Furthermore, information relating to the battery 18 is provided, in particular information relating to its temperature T and information relating to its state of charge, symbolically denoted by L; L may be a voltage, an amount of stored charge or a measure for the aging of the battery. The purpose of the controller, which can also be referred to as a "drive manager" is to allocate the partial torques to the individual drives 16 and 22 as well as the internal combustion engine 12 on the basis of specific aspects, such as the energy efficiency.

However, the distribution of the drive torque between the individual wheels 38 also affects the stability of the motor vehicle 10. Another factor relates to the motor vehicle 10 moving as safely as possible on the roadway, that is to say the vehicle being stable. For this purpose, a second controller 40 is now provided in the present case, and can also be referred to as a "chassis manager". The second controller 40 receives signals from a lateral acceleration sensor 42, a longitudinal acceleration sensor 44 and a yaw rate sensor 46, and knows the steering angle φ. Therefore, information is available allowing a statement to be made about the stable driving behavior of the motor vehicle 10 on the roadway.

Figure 2:
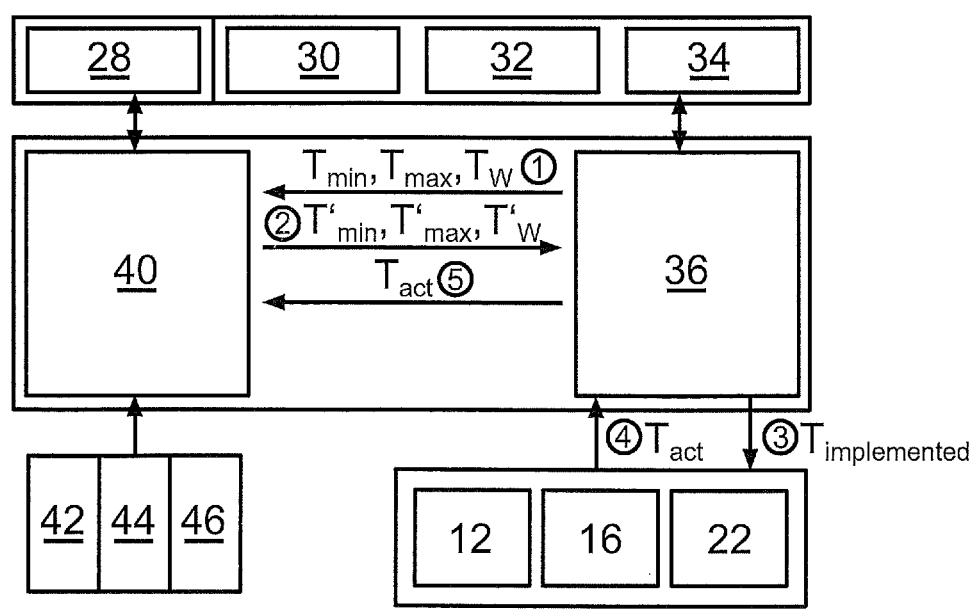
FIG. 2 shows a flowchart illustrating data flow between the individual elements shown in FIG. 1.

The method described in the following text with reference to FIG. 2 is now intended to ensure, with the involvement of the second controller 40, that the vehicle actually drives safely.

For this purpose, and in a manner known per se, the first controller 36 determines a total torque which can be applied to the four wheels 38 on the basis of the drive demands. For this purpose, the input variables at the elements 28, 30, 32, 34, 18 and 26 are taken into account. At the same time, it is also possible to use the rotation speed of the wheels 38, the speed of the motor vehicle, a gear selected in a gearbox, etc.

The controller 36 can now use the variables associated with the drives 16 and 22 and their battery 18 to determine what torque $T_{min}$ each of the drives 16, 22 can emit as a minimum, and what torque $T_{max}$ they can emit at a maximum. In addition, the controller 36 can determine a desired torque $T_W$.

Figure 3:
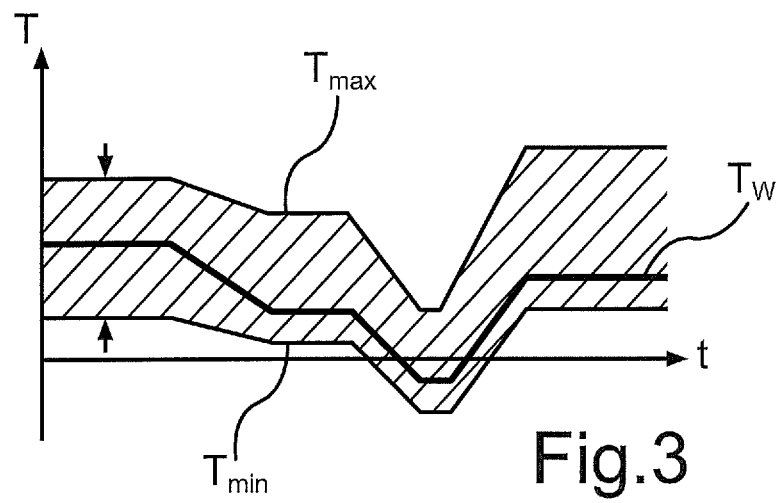
FIG. 3 shows the profile of a bandwidth of the torque of a drive, as a first controller predetermines it.

The controller 36 now emits information relating to these three variables to the controller 40. This is done continuously during operation of the motor vehicle, thus resulting overall in a profile over time t as shown in FIG. 3: the upper curve in FIG. 3 is the maximum torque $T_{max}$, the lower curve in FIG. 3 is the minimum torque $T_{min}$, and the central curve in FIG. 3 is the desired torque T. This therefore results in a band, shown in a shaded form, of possible torques T, which varies for different times t.

Figure 4:
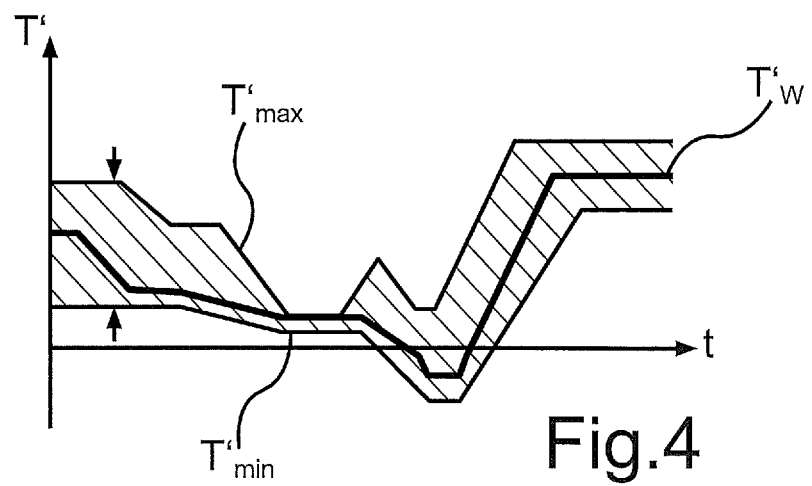
FIG. 4 shows a profile such as this, as a second controller emits therefor in response to the preset by the first controller.

The second controller 40 now receives the information relating to the variables $T_{min}$, $T_{max}$ and $T_W$. Furthermore, it receives measured values relating to the elements 28, 30, 32 and 34. In addition, the second controller 40 receives the measured values from the sensors 42, 44 and 46. Because of the latter, the second controller is able to exclude those torques T from the band shown in a shaded form in FIG. 3 for which the motor vehicle 10 could not be driven in a sufficiently stable form. These excluded values lie at the upper and at the lower end of the band between $T_{min}$ and $T_{max}$. In other words, the second controller defines new values $T'_{max}$ and $T'_{min}$, which define a restricted band, as shown with opposite shading in FIG. 4. At the same time, a desired torque $T'_W$ is output, for which driving of the motor vehicle results in a desired stability state, and in particular is particularly stable. Therefore, in a second step, the values $T'_{min}$, $T'_{max}$ and $T'_W$ are sent from the second controller 40 to the first controller 36. The purpose of the first controller 36 is now to definitely define a specific partial torque for the individual drives 16 and 22. The requirement in this case is for the first controller 36 not to define any partial torques outside the range between $T'_{min}$ and $T'_{max}$.

Figure 5A:
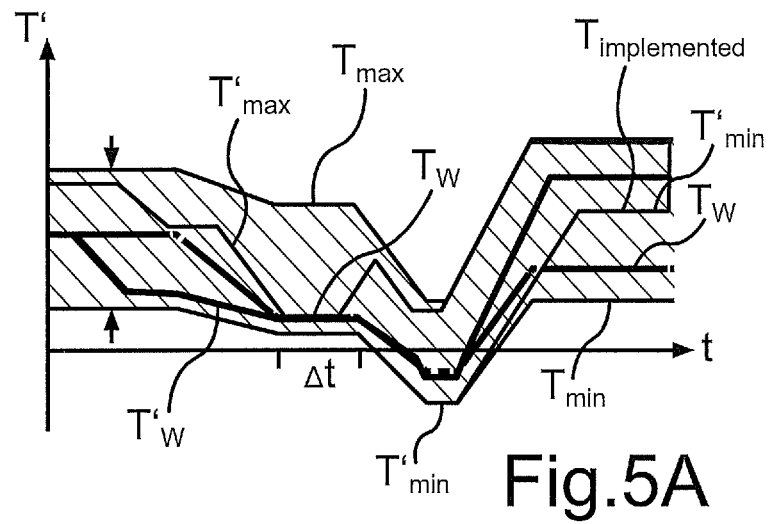
FIGS. 5A, 5B illustrate how the first controller in the end selects the torque in two different situations.

A distinction can now be drawn between two situations. In one situation, the aim is to select a motor vehicle efficiency mode with the aid of the operating element 34. This makes it possible to pay particular attention to energy efficiency. From the point of view of the first controller 36, it would therefore be worthwhile to implement the desired torque $T_W$. This desired torque $T_W$ is shown in FIG. 5A, with $T'_{max}$ and $T'_{min}$ also being shown there. There is now a time interval Δt, which $T_W$ is greater than $T'_{max}$. The actually defined torque $T_{implemented}$ may therefore not be equal to $T_W$ during the time interval Δt. During the rest of the time, $T_{implemented}$ is set to be equal to $T_W$. In the interval Δt, $T_{implemented}$ is set to be as close as possible to $T_W$, that is to say at the upper limit according to $T'_{max}$ from FIG. 4.

Figure 5B:
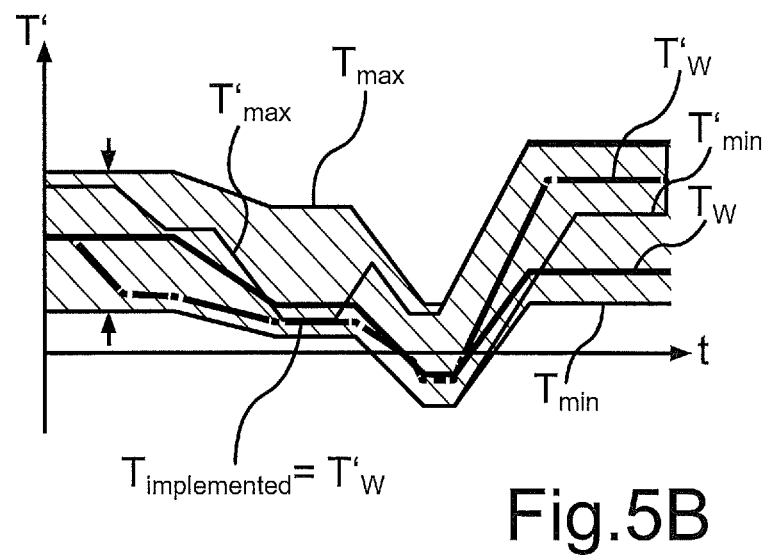

When the operating element 34 is in a sport mode, priority is given to the stability of the vehicle. In this situation, as is shown in FIG. 5B, $T_{implemented}$ is set to be equal to $T'_W$, that is to say corresponding to the desired preset for the second controller 40.

$T_{implemented}$ is a partial torque for one of the drives, for example the drive 16. If the intention is to drive exclusively electrically, this partial torque $T_{implemented}$ is subtracted from the total torque G, and this then results in the partial torque $T_{implemented,2} = G - T_{implemented}$ for the second drive 22.

When three drives are actually being used, specifically the internal combustion engine 12 as well, then the limits for the bandwidths for the partial torques of two of the three drives may be interchanged, and the third partial torque then results from this.

Therefore, in a third step, the first controller 36 sends a demand based on $T_{implemented}$ to the drives 16, 22 and 12. In a fourth step, the first controller 36 then receives the actually implemented drive torque $T_{act}$ back. In a fifth step, this information is passed to the second controller 40 in order that it can carry out its calculations at later times. Whenever step 1 is carried out again, this is preceded by the fifth step at some time.

The above description for the partial torques of the drives 16 and 22 can also be modified such that torques, in particular minimum and maximum torques as well as desired torques, can be indicated at the same time for a plurality of drives, in particular for drives which act on the same axle; in the present case, these will be the drives 12 and 16, for which a (total) torque will be indicated jointly.

The above description is also based on the assumption that the indicated partial torques are each instantaneously applicable values. However, it is also possible, in addition to the instantaneously applicable values which provide information about the instantaneous performance of the drives, to specify values which are the result of a prediction. Such predictive values may provide information about the performance of the drives at later times, as will occur with a certain probability. The predictive values may be sent both from the first control device 36 to the second control device 40, and also back again. The predictive values may play a significant role in the definition of the selection from the torque bands.

The functionalities which the two controllers 36 and 40 carry out in the above description of the figures can also be provided by software, in particular running in a single controller. Where the present text refers to the transmission of data, this then relates to an interchange of data values between software modules or subroutines in software in the single controller.

The following method has been described in one embodiment:

A method for operation of a motor vehicle (10) having at least two drives (12, 16, 22), with at least one input being received from a vehicle driver and a total torque being determined on the basis of the at least one input by a first control device (36), which total torque should be applied jointly by all the drives (12, 16, 22), with the first control device (36) receiving measured values and splitting the total torque into partial torques which are allocated to the individual drives (12, 16, 22), as a function thereof, and with the first control device sending control commands to total drives, demanding the respective partial torques from the drives, characterized in that the first control device (36) first of all uses the measured values to predetermine a family of combinations of respective torques for drive units (the individual drives or a plurality of drives together in at least one group), and sends data signals ($T_{min}$, $T_{max}$, $T_W$) to describe these combinations to a second control device, the second control device receiving the measured values relating to variables which differ at least partially from those variables with which the measured values received by the first control device (36) are associated, and with the second control device (40) selecting at least one combination of respective partial torques for the individual drives or groups of drives as a function of the received measured values, and sending data signals ($T'_{min}$, $T'_{max}$ and $T'_W$) being described as at least one combination to the first control device (36), with the first control device (36) then defining the partial torques for the individual drives (12, 16, 22) or groups of drives and for this purpose possibly itself making a selection from a plurality of combinations, selected by the second control device (40), as a function of the measured values received by the first control device.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for operating a motor vehicle having at least two drives units, comprising:
   receiving an input from a vehicle driver at a first control device;
   determining a total torque at the first control device based on the input from the vehicle driver;
   receiving at the first control device, first measured values relating to first variables;
   predetermining at the first control device, a family of combinations of respective partial torques for individual drive units;
   sending first data signals from the first control device to a second control device, the first data signals relating to the family of combinations;
   receiving at the second control device, second measured values relating to second variables, which differ from the first variables;
   selecting at the second control device, a chosen combination from the family of combinations;
   sending second data signals from the second control device to the first control device, the second data signals relating to the chosen combination;
   splitting the total torque at the first control device only after receiving the second data signals from the second control device, the total torque being split into final partial torques for the individual drive units, the total torque being split into final partial torques based on criteria different from the first and second variables; and
   sending control commands from the first control device to the individual drive units, in order to demand from the individual drive units the respective final partial torques.

2. The method according to claim 1, wherein
   the first data signals sent by the first control device to the second control device relate to a maximum and a minimum partial torque,
   in response to the first data signals, the second control device sends the first control device feedback information relating to the maximum and the minimum partial torque and/or relating to a defined partial torque for at least one of the drive units, with the feedback information being applicable to at least one time period during operation of the motor vehicle, and
   the feedback information suggests:
      reducing the maximum torque and/or the defined partial torque, and/or
      increasing the minimum partial torque and/or the defined partial torque.

3. The method according to claim 1, wherein
   the second measured values received at the second control device relate to at least one of a yaw rate of the motor vehicle, a longitudinal acceleration of the motor vehicle, a lateral acceleration of the motor vehicle, and a steering angle on a steering control, and
   the second control device takes the second measured values into account in the selection of the chosen combination.

4. The method according to claim 1, wherein
   at least one of the drive units is an electrical drive, and
   the first measured values received by the first control device relate to a battery which is associated with the electrical drive.

5. The method according to claim 1, wherein
   the first measured values received by the first control device relate to a rotation speed of a motor or engine and/or relate to a temperature of the motor or engine and/or relate to a gear which has been selected at a gearbox, and/or relate to an operating mode.

6. The method according to claim 2, wherein
   the second measured values received at the second control device relate to at least one of a yaw rate of the motor vehicle, a longitudinal acceleration of the motor vehicle, a lateral acceleration of the motor vehicle, and a steering angle on a steering control, and
   the second control device takes the second measured values into account in the selection of the chosen combination.

7. The method according to claim 6, wherein
   at least one of the drive units is an electrical drive, and
   the first measured values received by the first control device relate to a battery which is associated with the electrical drive.

8. The method according to claim 7, wherein
the first measured values received by the first control device relate to a rotation speed of a motor or engine and/or relate to a temperature of the motor or engine and/or relate to a gear which has been selected at a gearbox, and/or relate to an operating mode.

9. The method according to claim 1, wherein
predetermining the family of combinations at the first control device comprises splitting torque between an electrical motor and a gasoline engine based on energy efficiency, and
the second control device restricts the partial torque applied to one or more wheels for driving stability.

10. The method according to claim 1, wherein after receiving the second data signals from the second control device, the first control device splits the total torque into final partial torques based on a sport mode or an efficiency mode selection.

11. A motor vehicle comprising:
at least two drives units;
a first control device to allocate a total torque to individual drives units and to transmit appropriate demand signals to the drive units, wherein
the first control device is coupled to a second control device,
the second control device is coupled to and receives measured values from at least one measurement device which is separated from the first control device,
the first control device predetermines a family of combinations of respective partial torques for the individual drive units,
the first control device sends first data signals to the second control device, the first data signals relating to the family of combinations,
the second control device selects a chosen combination from the family of combinations, based on the measured values,
the second control device sends second data signals to the first control device, the second data signals relating to the chosen combination, and
in response to the second data signals, the first control device splits the total torque into final partial torques for the individual drive units only after receiving the second data signals from the second control device, the total torque being split into final partial torques based on criteria different from that used to predetermine the family of combinations and different from the measured values used by the second control device, the first control device sending control commands to the individual drive units, in order to demand the respective final partial torques from the individual drive units.

12. The motor vehicle according to claim 11, wherein
the at least one measurement device comprises at least one device selected from the group consisting of a yaw rate sensor, a longitudinal acceleration sensor, a lateral acceleration sensor and a device to measure a steering angle on a steering control.

13. The motor vehicle according to claim 11, wherein after receiving the second data signals from the second control device, the first control device splits the total torque into final partial torques based on a sport mode or an efficiency mode selection.

* * * * *